United States Patent
Wissler et al.

[11] Patent Number: 6,082,102
[45] Date of Patent: Jul. 4, 2000

[54] NO_X REDUCTION SYSTEM WITH A DEVICE FOR METERING REDUCING AGENTS

[75] Inventors: Gerhard Wissler, Sünching; Günther Pajonk, Zapfendorf; Lothar Hofmann, Altenkunstadt; Manfred Weigl, Sinzing; Wieland Mathes; Ronald Neufert, both of Michelau; Klaus Wenzlawski, Nürnberg; Dietmar Weisensel, Sinzing, all of Germany

[73] Assignee: Siemens Aktiengesellschaft, Munich, Germany

[21] Appl. No.: 09/161,203

[22] Filed: Sep. 25, 1998

[30] Foreign Application Priority Data

Sep. 30, 1997 [DE] Germany ............ 197 43 337

[51] Int. Cl.$^7$ ....................................... F01N 3/00
[52] U.S. Cl. ................. 60/286; 60/295; 60/301; 60/303
[58] Field of Search ............. 60/286, 295, 301, 60/303

[56] References Cited

U.S. PATENT DOCUMENTS

| | | | |
|---|---|---|---|
| 4,462,208 | 7/1984 | Hicks et al. ............ | 60/286 |
| 5,367,875 | 11/1994 | Aboujaoude et al. ...... | 60/303 |
| 5,369,956 | 12/1994 | Daudel et al. .......... | 60/274 |
| 5,651,247 | 7/1997 | Frankle ................ | 60/274 |
| 5,809,774 | 9/1998 | Peter-Hoblyn et al. .... | 60/274 |
| 5,809,775 | 9/1998 | Tarabulski et al. ...... | 60/274 |
| 5,829,248 | 11/1998 | Clifton ................ | 60/286 |
| 5,884,475 | 3/1999 | Hoffmann et al. ........ | 60/274 |
| 5,924,280 | 7/1999 | Tarabulski ............. | 60/274 |
| 5,992,141 | 11/1999 | Berriman et al. ........ | 60/274 |

FOREIGN PATENT DOCUMENTS

| | | |
|---|---|---|
| 0 555 746 A1 | 8/1993 | European Pat. Off. . |
| 9308772 | 11/1993 | Germany . |

OTHER PUBLICATIONS

German Utility Model DE 297 17 494 U1, dated Jan. 29, 1998, device for reducing NOx in the exhaust gas of a combustion engine.

Japanese Patent Abstract No. 06146863 (Mitsuru), dated May 27, 1994.

*Primary Examiner*—Thomas Denion
*Assistant Examiner*—John W. Flude
*Attorney, Agent, or Firm*—Herbert L. Lerner; Laurence A. Greenberg; Werner H. Stemer

[57] ABSTRACT

A NO$_x$ reduction system includes an SCR catalytic converter and a metering assembly for reducing agent. A control unit for the reduction system is integrated together with the actuators and sensors as a functional unit at the reducing agent container. This provides savings in terms of lines and plug-in connections, and relieves the burden on the control unit of the internal combustion engine.

11 Claims, 1 Drawing Sheet

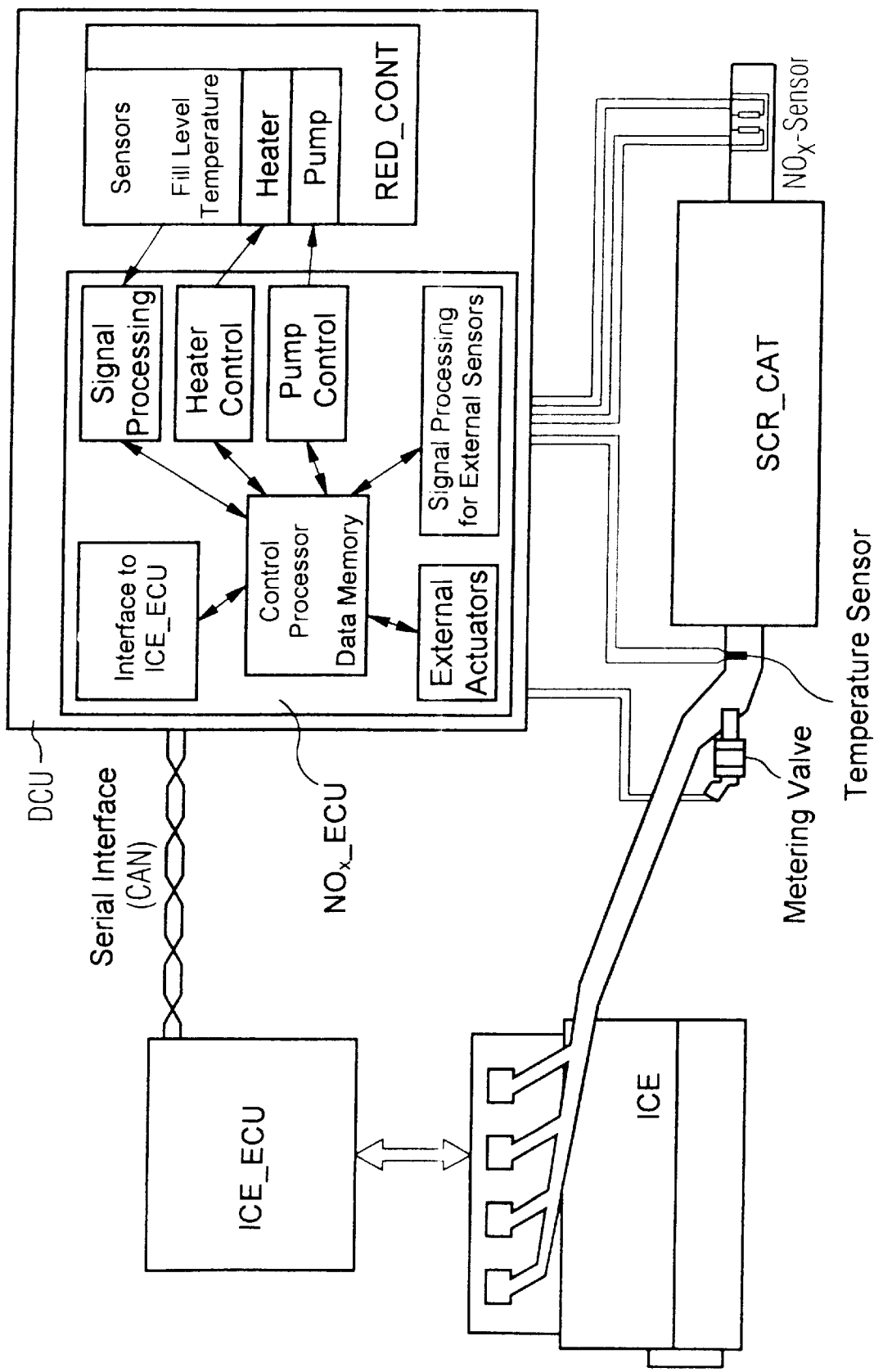

$NO_x$ REDUCTION SYSTEM WITH A DEVICE FOR METERING REDUCING AGENTS

BACKGROUND OF THE INVENTION

Field of the Invention

The invention relates to a $NO_x$ reduction system with a device for metering in the reducing agents. The system is used in an internal combustion engine operating with excess air, in particular a diesel internal combustion engine, and it includes: an SCR catalytic converter in the exhaust system of the internal combustion engine, a reducing agent container for storing reducing agent, a metering device for the controlled delivery of the reducing agent into the exhaust system upstream of the SCR catalytic converter, and a control device with associated sensors and actuators for controlling the $NO_x$ reduction system.

While the exhaust gas of an Otto(spark-ignition) internal combustion engine operated with an air factor $\lambda=1$ can be effectively cleaned with respect to the main emissions of nitrogen oxides $No_x$, hydrocarbons HC and carbon monoxide using so-called three way catalyst, such a catalyst is of only limited suitability for the after-treatment of exhaust gases from an internal combustion engine operating with excess air ($\lambda>1$) (diesel internal combustion engine or Otto internal combustion engine with lean mixture). Only the hydrocarbons and the carbon monoxide are substantially abated, while the level of nitrogen oxides cannot be significantly reduced on account of the high oxygen content in the exhaust gas.

The level of nitrogen oxide emissions from internal combustion engines of this type can be reduced using the so-called selective catalytic reaction (selective catalytic reduction, SCR process). As a reducing agent, ammonia $NH_3$ is frequently made available to the SCR process by urea hydrolysis. The urea entrained in aqueous solution is thereby used as an ammonia carrier and is converted to ammonia using a metering system upstream of a hydrolysis catalyst. The ammonia then reduces the nitrogen oxides in the actual SCR catalytic converter. Further, it is also possible to use ammonia directly as a reducing agent. No hydrolysis catalyst is then necessary.

An $NO_x$ reduction system of this type, with an SCR catalytic converter and metering of the reducing agent, requires sensors and actuators, such as temperature sensors and $NO_x$ sensors in the exhaust, upstream and downstream of the SCR catalytic converter, respectively, a metering valve, a reducing agent container with measurement of the fill level and temperature, a heating device, and a feed system (pump and lines). In order to control the $NO_x$ reduction system, special control and regulation algorithms are needed for accurate metering and for the reducing agent container, in addition to the internal combustion engine management.

The following problems result:

a) The electrical connections of all the sensors and actuators in the exhaust system and the reducing agent container require an elaborate extension to the wiring harness of the internal combustion engine. This is particularly so since these components cannot be mounted directly at the internal combustion engine or in the vicinity of the electronic control unit of the internal combustion engine.

b) The long cable lengths require increased outlay in terms of electromagnetic compatibility, and in particular the sensors require separate ground lines in order to permit correct measured values in spite of heavy currents for the actuators (metering valve, feed pump and heating of the reducing agent).

c) The sensors and actuators take up extra inputs and outputs at the electronic control unit of the internal combustion engine. The computer of the control unit is burdened by data specific to metering and the tank, for example valve characteristics, sensor responses and by controlling the metering, heating and feed pump.

SUMMARY OF THE INVENTION

It is accordingly an object of the invention to provide an $NO_x$ reduction system for an internal combustion engine of the type mentioned above, which overcomes the above-mentioned disadvantages of the heretofore-known devices and methods of this general type.

With the foregoing and other objects in view there is provided, in accordance with the invention, an $NO_x$ reduction system for an internal combustion engine operating with excess air, specifically for a diesel engine, comprising:

an SCR catalytic converter arranged in an exhaust system of an internal combustion engine;

a reducing agent container for storing reducing agent;

a metering device communicating with the reducing agent container for controlled delivery of the reducing agent into the exhaust system upstream of the SCR catalytic converter in a direction of exhaust gas flow in the exhaust system; and a control device assembly integrated in the reducing agent container for controlling the $NO_x$ reduction system, the control device assembly being a functional unit comprising a control device and associated sensors and actuators for storing, feeding, conditioning, and metering the reducing agent.

By integrating the control unit for the $NO_x$ reduction system as a single functional unit, together with the actuators and sensors at the reducing agent container, which undertakes all the functions needed for controlling, regulating, feeding and reducing-agent metering, it is possible to solve all the problems listed above under a) to c).

In accordance with an added feature of the invention, a serial interface connects the control device to the control unit of the internal combustion engine. The electrical connections within this functional unit can be made inexpensively and without extra need for installation space. Only short cable runs are integrated in the design of the housing, and no separate plug-in connections, are then required. The use of the serial interface as a connection to the control unit of the internal combustion engine greatly minimizes the wiring outlay.

In accordance with an additional feature of the invention, the sensors include sensors assigned to the reducing agent container, and the control device contains signal-conditioning circuits receiving signals from the sensors assigned to the reducing agent container, such as sensors for determining a fill level and a temperature of the reducing agent.

Through the integration of the sensor signal conditioning in a separate control unit, the EMC-correct design of the sensor wiring in the exhaust line is also simplified since the grounding can be optimized independently of the control unit of the internal combustion engine. The sensors at the reducing agent container can be electrically connected very simply to the signal processing system, on account of the spatial integration. Because of the direct allocation of sensors to the control unit, it is also possible to use cost-efficient uncalibrated sensors since the calibration can be stored in the control unit specifically for the particular case.

In accordance with another feature of the invention, sensors are provided at the SCR catalytic converter, and the control device contains signal processing circuits for the signals detected by the sensors at the SCR catalytic converter. Those sensors may include sensors for determining a temperature and a $NO_x$ content in the exhaust gas flow through the exhaust system.

In accordance with a further feature of the invention, the control device contains control circuits for the actuators assigned to the reducing agent container, such as a feed pump and a heating device for the reducing agent.

In accordance with a concomitant feature of the invention, the control device contains control circuits for driving external actuators, for instance a metering valve for metering the reducing agent and a control circuit in the control device for driving the metering valve.

The control unit of the internal combustion engine requires only one serial interface (e.g. CAN, controller area network). In many applications, this interface is in any case needed in the control system of the internal combustion engine, and does not represent additional outlay. The control unit of the internal combustion engine merely needs to provide this interface with the requisite data, for example mass of exhaust gas, start of injection, and amount of fuel per combustion cycle.

Other features which are considered as characteristic for the invention are set forth in the appended claims.

Although the invention is illustrated and described herein as embodied in a $NO_x$ reduction system with a device for metering reducing agents, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The FIGURE is a block diagram showing details of the novel system in combination with an internal combustion engine.

DESCRIPTION OF THE PREFERRED EMBODIMENTS

Referring now to the sole FIGURE of the drawing in detail, there is seen an internal combustion engine ICE with associated internal combustion engine control unit ICE_ECU, and an $NO_x$ reduction system consisting of an SCR catalytic converter SCR_CAT, a reducing agent container RED_CONT and a control unit $NO_x$_ECU. The latter is integrated with the reducing agent container RED_CONT and, consequently, represented inside a block in the FIGURE and labeled as metering unit with an integrated control unit DCU.

The reducing agent container RED_CONT has a pump for feeding the reducing agent, and an electrical heating device for heating the reducing agent. By means of a corresponding sensor system, both the temperature and the fill level of the reducing agent in the container are detected. These signals are transmitted to the control unit $NO_x$-ECU for signal processing and further treatment.

The control unit at the reducing agent container contains the following functional blocks:

A serial interface (e.g.: CAN-BUS) to the control unit of the internal combustion engine ICE_ECU and/or to further control units. The interface is used to transmit, for example, engine speed, control travel and charge-air temperature.

An external actuator drive system with the facility to check the actuators, for example by measuring flows or reaction times. The metering valve for the reducing agent is driven with the aid of this block.

All required voltage supplies and signal processing circuits for the internal sensors (fill level, temperature of the reducing agent) and external sensors (temperature sensor and $NO_x$ sensor in the exhaust).

All signal evaluations according to sensor-specific reference data.

Heating and pump control for the reducing agent container.

Plausibility checks on the sensor signals (error detection, diagnosis).

Self-calibration functions and diagnosis.

These functions, represented using blocks, are performed by a control computer with an associated data memory.

We claim:

1. An $NO_x$ reduction system for an internal combustion engine operating with excess air, comprising:

an SCR catalytic converter arranged in an exhaust system of an internal combustion engine;

a reducing agent container for storing reducing agent;

a metering device communicating with said reducing agent container for controlled delivery of the reducing agent into the exhaust system upstream of said SCR catalytic converter in a direction of exhaust gas flow in the exhaust system; and a control device assembly integrated in said reducing agent container for controlling the $NO_x$ reduction system, said control device assembly being a functional unit comprising a control device and associated sensors and actuators for storing, feeding, conditioning, and metering the reducing agent.

2. The device according to claim 1, which further comprises a serial interface connecting said control device to a control unit of the internal combustion engine.

3. The device according to claim 1, wherein said sensors include sensors assigned to said reducing agent container, and said control device contains signal-conditioning circuits receiving signals from said sensors assigned to said reducing agent container.

4. The device according to claim 3, wherein said sensors assigned to said reducing agent container include sensors for determining a fill level and a temperature of the reducing agent.

5. The device according to claim 1, which comprises sensors disposed at said SCR catalytic converter, and wherein said control device contains signal processing circuits for signals detected by said sensors at said SCR catalytic converter.

6. The device according to claim 5, wherein said sensors assigned to said SCR catalytic converter includes sensors for determining a temperature and a $NO_x$ content in the exhaust gas flow through the exhaust system.

7. The device according to claim 1, wherein said control device contains control circuits for said actuators assigned to said reducing agent container.

8. The device according to claim 7, wherein said actuators include actuators for a feed pump and a heating device for the reducing agent.

9. The device according to claim 7, wherein said control device contains control circuits for driving external actuators.

10. The device according to claim 7, which further comprises a metering valve for metering the reducing agent and a control circuit in said control device for driving said metering valve.

11. The device according to claim 1, wherein said exhaust system is an exhaust gas system of a diesel engine.

* * * * *